Patented Aug. 8, 1950

2,517,895

UNITED STATES PATENT OFFICE 2,517,895

STABILIZED CHLOROHYDROCARBON CLEANING COMPOSITION

Arthur W. Larchar, Mendenhall, Pa., assignor to E. I. du Pont de Nemours & Company, Wilmington, Del., a corporation of Delaware No Drawing. Application May 13, 1946, Serial No. 669,460

8 Claims. (Cl. 252—171)

This invention relates to the stabilization of chlorinated hydrocarbons against decomposition and their use as cleaning compositions, such as in the degreasing of metals. More particularly this invention relates to a method for preventing or retarding the metal-induced decomposition of volatile chlorohydrocarbon solvents and to compositions containing volatile chlorohydrocarbon solvents stabilized against decomposition, such as is encountered in the degreasing of metals.

Although volatile chlorinated hydrocarbons are excellent cleaning and degreasing agents, they possess certain disadvantages when used in contact with metals. The use of volatile chlorinated hydrocarbons, such as trichloroethylene, for degreasing metals or in metallic apparatus, has the disadvantage that metals, such as aluminum or iron, tend to induce and catalyze certain condensation reactions involving the chlorine atoms of the chlorinated hydrocarbons. As a result, the solvent may decompose, sometimes vigorously, with the evolution of products such as hydrochloric acid or phosgene and the formation of a gummy mass. Thus metallic apparatus in which the solvent is used, is subject to severe corrosion and dangerous fumes are given off. It is therefore of great industrial importance to prevent or retard metal-induced decomposition of volatile chlorinated hydrocarbon solvents. Since cleaning treatments of metals or other objects are in practice carried out in the vapor as well as in the liquid phase, it is necessary to prevent decomposition of the volatile hydrocarbon solvent in both the vapor and liquid phases.

An object of this invention is to provide a method for preventing or substantially retarding the decomposition of volatile chlorinated hydrocarbon solvents in the presence of metals, such as iron or aluminum. A further object of this invention is to provide a cleaning composition comprising a volatile chlorohydrocarbon solvent which is stabilized against metal-induced decomposition. A still further object is to provide a cleaning composition comprising a stabilized volatile chlorohydrocarbon solvent in which the stabilizer is sufficiently volatile to be present in effective amounts in the vapor of the chlorohydrocarbon. Another object is to provide a stabilizer for volatile chlorohydrocarbons which is effective in low concentrations in both the liquid and vapor phase. An important object is to provide a stabilized chlorinated hydrocarbon solvent for the degreasing of metals. An additional object is to provide a practical and safe method of degreasing metals with a volatile chlorohydrocarbon solvent. Other objects will appear hereinafter.

These objects are accomplished by adding to the volatile chlorinated hydrocarbon an effective amount of a 1,3-dicarbonyl compound, particularly a saturated aliphatic beta-diketone boiling below about 175° C. It has now been discovered that volatile chlorohydrocarbon solvents containing a small amount of a 1,3-dicarbonyl compound, boiling below about 175° C., especially a saturated aliphatic beta-diketone boiling below about 175° C. are stabilized toward metal-induced decomposition.

The stabilizers suitable for the purpose of this invention are 1,3-dicarbonyl compounds, particularly the saturated aliphatic beta-diketones, also called 1,3-diketones, boiling below about 175° C. The preferred 1,3-dicarbonyl compounds are those boiling below about 175° C. and having the general formula

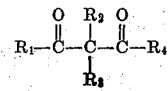

where $R_1$ and $R_4$ are alkyl groups of not more than three carbon atoms, and $R_2$ and $R_3$ are hydrogen or alkyl groups of not more than three carbon atoms. Examples of such 1,3-dicarbonyl stabilizers against metal-induced decomposition are propionylacetone, butyrylacetone, isobutyrylacetone and 2,2-dimethyl acetylacetone. For reasons of accessibility and effectiveness, acetylacetone is the most preferred stabilizer against metal-induced decomposition.

In order to be effective in the vapor phase as well as in the liquid phase, the stabilizer must be volatile with the vapor of the chlorinated hydrocarbon solvent. For practical purposes, this requires that the stabilizer should have a boiling point below about 175° C. and preferably below 150° C. Saturated aliphatic beta-diketones boiling below 150° C. are preferred for use in this invention.

For effective results, the beta-diketone should be used in amounts of at least 0.02% based on the weight of the chlorohydrocarbon. It is in general unnecessary to use more than a small amount, such as 1% of the beta-diketone, a concentration of about 0.05 to 0.25% based on the chlorohydrocarbon being preferred in most instances. If desired, other stabilizers may be used in conjunction with the beta-diketone and other beneficial adjuvants, such as known anti-oxidants, may be added.

The chlorinated hydrocarbons to which this invention is chiefly applicable are the volatile chlorohydrocarbon solvents, boiling below about 150° C., particularly the volatile aliphatic chlorohydrocarbon solvents, examples of which are chloroform, carbon tetrachloride, and the lower alkyl chlorides, such as the butyl, amyl and hexyl chlorides, dichloroethane, trichloroethylene, tetrachloroethylene and tetrachloroethane. However, this invention is generally applicable to volatile chlorohydrocarbons and includes cyclic chlorohydrocarbons, such as chlorobenzene and chlorocyclohexane.

One of the most important of the volatile chlorohydrocarbon solvents is trichloroethylene and the invention will be further illustrated with reference to this particular solvent. In the following examples, parts are by weight, unless otherwise stated.

Example I

In comparative tests, two mixtures of 75 parts of trichloroethylene and 0.2 part of 100 mesh aluminum powder were held at 150° C. for 24 hours in sealed glass tubes from which substantially all oxygen had been removed. One sample contained 0.1% by weight of acetylacetone, the other was an unstabilized control. At the end of the test, each vessel and its contents was washed thoroughly with 100 parts of 5% nitric acid, and the chloride content of the wash liquor was determined by adding excess of 0.02 N silver nitrate solution and back titrating with 0.02 N potassium thiocyanate solution, using ferric alum indicator. It was found that 100 parts of the unstabilized control contained 0.389 part of chloride ion, whereas 100 parts of the sample stabilized with acetylacetone contained only 0.0064 part of chloride ion. Thus, in the presence of acetylacetone, there was substantially complete stabilization even under the drastic conditions of this accelerated test.

Example II

The effectiveness of beta-diketones in conjunction with known oxidation inhibitors for chlorinated hydrocarbon solvents, such as aniline, is shown by the following tests. Five hundred and forty (540) parts of trichloroethylene containing 0.04% by weight of aniline was boiled under total reflux with 5 parts of 100 mesh aluminum powder and 0.5 part of iron powder. Samples were withdrawn periodically and acidity was determined by titration with 0.01 N sodium hydroxide. After 17 days, 25.1 cc. were required to neutralize the acid in a 25 cc. sample. In an exactly similar test except that the trichloroethylene contained 0.04% aniline and 0.04% acetylacetone, a 25 cc. sample taken after 17 days required only 9.8 cc. of 0.01 N sodium hydroxide. Thus, the presence of acetylacetone had brought about a nearly three-fold improvement in stabilizing action over aniline alone. When no stabilizer at all is used in the above-described test, the acidity developed in a 25 cc. sample corresponds to 68 cc. of 0.01 N sodium hydroxide after only 24 hours refluxing.

The stabilized chlorohydrocarbons made available by this invention find their chief use in the cleaning and degreasing of metals or alloys such as iron, steel, aluminum, nickel, chromium, copper, brass, and the like or of articles made therefrom. However, they are also useful whenever a chlorinated solvent is to be used in metallic apparatus, as in the textile cleaning industry or in solvent extraction processes. The volatile stabilizers of this invention have the further advantage that they can be recovered with the solvent when the latter is distilled from the oil, grease and dirt left in it after a cleaning operation, thus avoiding unnecessary waste and economic loss.

As many apparently widely different embodiments of this invention may be made without departing from the spirit and scope thereof, it is to be understood that I do not limit myself to the specific embodiments thereof except as defined in the appended claims.

I claim:

1. A method for retarding the metal-induced decomposition of a volatile aliphatic chlorohydrocarbon solvent boiling below about 150° C. which comprises adding thereto from .02% to 1%, based on the weight of said volatile aliphatic chlorohydrocarbon solvent, of a saturated aliphatic 1,3-diketone boiling below 175° C. and selected from the group consisting of acetylacetone, propionylacetone, butyrylacetone, isobutyrylacetone and 2,2-dimethyl acetylacetone.

2. A method for retarding the metal-induced decomposition of trichloroethylene which comprises adding thereto from .02% to 1%, based on the weight of said trichloroethylene, of a saturated aliphatic 1,3-diketone boiling below 175° C. and selected from the group consisting of acetylacetone, propionylacetone, butyrylacetone, isobutyrylacetone and 2,2-dimethyl acetylacetone.

3. A method for retarding the metal-induced decomposition of a volatile aliphatic chlorohydrocarbon solvent boiling below about 150° C. which comprises adding thereto from .02% to 1%, based on the weight of said volatile aliphatic chlorohydrocarbon solvent, of acetylacetone.

4. A method for retarding the metal-induced decomposition of trichloroethylene which comprises adding thereto from .02% to 1%, based on the weight of said trichloroethylene, of acetylacetone.

5. A cleaning composition stabilized against metal-induced decomposition consisting essentially of a volatile aliphatic chlorohydrocarbon solvent boiling below about 150° C. and from .02% to 1%, based on the weight of said volatile aliphatic chlorohydrocarbon solvent of a saturated aliphatic 1,3-diketone boiling below 175° C. and selected from the group consisting of acetylacetone, propionylacetone, butyrylacetone, isobutyrylacetone and 2,2-dimethyl acetylacetone.

6. A cleaning composition stabilized against metal-induced decomposition consisting essentially of trichloroethylene, and from .02% to 1%, based on the weight of said trichloroethylene, of a saturated aliphatic 1,3-diketone boiling below 175° C. and selected from the group consisting of acetylacetone, propionylacetone, butyrylacetone, isobutyrylacetone and 2,2-dimethyl acetylacetone.

7. A cleaning composition stabilized against metal-induced decomposition consisting essentially of a volatile aliphatic chlorohydrocarbon solvent boiling below about 150° C. and from .02% to 1%, based on the weight of said volatile aliphatic chlorohydrocarbon solvent, of acetylacetone.

8. A cleaning composition stabilized against metal-induced decomposition consisting essentially of trichloroethylene and from .02% to 1%, based on the weight of said trichloroethylene, of acetylacetone.

ARTHUR W. LARCHAR.

REFERENCES CITED

The following references are of record in the file of this patent:

UNITED STATES PATENTS

| Number | Name | Date |
|---|---|---|
| 2,197,477 | Lyons et al. | Apr. 16, 1940 |
| 2,371,645 | Aitchison et al. | Mar. 20, 1945 |

FOREIGN PATENTS

| Number | Country | Date |
|---|---|---|
| 548,262 | Great Britain | Oct. 2, 1942 |